UNITED STATES PATENT OFFICE.

LEVI ABBOTT, OF LEWISTON, MAINE, ASSIGNOR OF ONE-HALF HIS RIGHT TO ALBERT B. EDWARDS AND JOHN READE, OF SAME PLACE.

IMPROVEMENT IN CEMENTS FOR THE MANUFACTURE OF BRUSHES.

Specification forming part of Letters Patent No. 156,112, dated October 20, 1874; application filed March 13, 1874.

*To all whom it may concern:*

Be it known that I, LEVI ABBOTT, of the city of Lewiston, in the county of Androscoggin and State of Maine, have invented a new and Improved Cement or Composition, of which the following is a specification:

The object of the said invention is the combination of the following-named ingredients: Red lead, Portland or Roman cement, Rosendale cement, flowers of sulphur, and plaster-of-paris, so as to produce a solid cement or composition, to be used in the manufacture of brushes, that is impervious to water and not affected by either heat or cold, and which will hold the bristles or brush-stock firmly in place.

To enable others skilled in the arts to which it appertains to make and use my invention, I will proceed to describe the method of compounding it.

To prepare the cement for use, take, by measure, one (1) part of red lead, one (1) part of Portland or Roman cement, one (1) part of Rosendale cement, two (2) parts of flowers of sulphur, and twelve (12) parts of plaster-of-paris, and mix with sufficient weak lime-water to make the whole mass of about the consistency of cream. While the lime-water is being added the ingredients must be well stirred to incorporate them thoroughly. Use at once.

I claim as my invention and desire to secure by Letters Patent—

A cement to be used in the manufacture of brushes and analogous articles, consisting of the within-named ingredients in substantially the proportions set forth.

LEVI ABBOTT.

Witnesses:
J. A. KNIGHT,
CYRUS KNAPP.